(12) United States Patent
Nakano

(10) Patent No.: US 8,947,774 B2
(45) Date of Patent: Feb. 3, 2015

(54) CATADIOPTRIC OPTICAL SYSTEM AND IMAGE PICKUP APPARATUS HAVING THE SAME

(75) Inventor: Masatsugu Nakano, Tucson, AZ (US)

(73) Assignee: Canon Kabushiki Kaisha (JP)

( * ) Notice: Subject to any disclaimer, the term of this patent is extended or adjusted under 35 U.S.C. 154(b) by 535 days.

(21) Appl. No.: 13/401,999

(22) Filed: Feb. 22, 2012

(65) Prior Publication Data

US 2012/0212600 A1 Aug. 23, 2012

(30) Foreign Application Priority Data

Feb. 22, 2011 (JP) ................................. 2011-035746

(51) Int. Cl.
*G02B 17/00* (2006.01)
*G02B 17/08* (2006.01)

(52) U.S. Cl.
CPC ........ *G02B 17/0808* (2013.01); *G02B 17/0856* (2013.01)
USPC .............. 359/366; 359/364; 359/365; 348/79

(58) Field of Classification Search
CPC ............... G02B 17/08; G02B 17/0804; G02B 17/0808; G02B 17/0856
See application file for complete search history.

(56) References Cited

U.S. PATENT DOCUMENTS

| | | | |
|---|---|---|---|
| 4,208,099 A | | 6/1980 | Tojyo |
| 4,346,989 A | * | 8/1982 | Gort et al. ...................... 356/5.1 |
| 5,031,976 A | * | 7/1991 | Shafer ............................ 359/355 |
| 5,999,310 A | * | 12/1999 | Shafer et al. ................... 359/351 |
| 6,313,467 B1 | * | 11/2001 | Shafer et al. ................... 250/372 |
| 6,473,243 B1 | | 10/2002 | Omura |
| 6,483,638 B1 | * | 11/2002 | Shafer et al. ................... 359/351 |
| 6,639,734 B2 | * | 10/2003 | Omura .......................... 359/730 |
| 6,707,616 B1 | * | 3/2004 | Takahashi et al. ............. 359/649 |
| 6,862,142 B2 | * | 3/2005 | Lange ............................ 359/689 |
| 7,136,234 B2 | * | 11/2006 | Shafer et al. ................... 359/726 |
| 7,646,533 B2 | * | 1/2010 | Chuang et al. ................. 359/364 |

(Continued)

FOREIGN PATENT DOCUMENTS

JP 53-112759 A 10/1978
JP 60-034737 B2 8/1985

(Continued)

OTHER PUBLICATIONS

Japanese Office Action dated Aug. 12, 2014 issued in corresponding Japanese Application No. 2011-035746.

*Primary Examiner* — Sath V Perungavoor
*Assistant Examiner* — Matthew J Anderson
(74) *Attorney, Agent, or Firm* — Rossi, Kimms & McDowell LLP

(57) ABSTRACT

A catadioptric optical system includes a first imaging optical system that includes a catadioptric part that collects a light beam from an object to form an intermediate image of the object, and a second imaging optical system that includes a refractive part that images the intermediate image on an image plane. The first imaging optical system includes a first optical element, a second optical element, and a negative lens in an optical path between the first and second optical elements, and the first and second optical elements are disposed so that reflection parts of the first and second optical element face each other. A power φn of the negative lens, radii of curvature R1n and R2n of lens surfaces of the negative lens at an object side and an image side, respectively, and a power φ1 of the first imaging optical system are appropriately set.

9 Claims, 7 Drawing Sheets

(56) References Cited

U.S. PATENT DOCUMENTS

| | | | |
|---|---|---|---|
| 7,672,043 B2 * | 3/2010 | Armstrong et al. | 359/351 |
| 7,728,968 B2 * | 6/2010 | Tsai et al. | 356/237.5 |
| 7,777,963 B2 * | 8/2010 | Conradi et al. | 359/649 |
| 8,675,276 B2 * | 3/2014 | Shafer et al. | 359/366 |
| 8,810,711 B2 * | 8/2014 | Maezawa | 348/335 |
| 2002/0085271 A1 * | 7/2002 | Shafer et al. | 359/359 |
| 2007/0171547 A1 | 7/2007 | Shafer et al. | |
| 2008/0316451 A1 * | 12/2008 | Mann et al. | 355/53 |

FOREIGN PATENT DOCUMENTS

| | | |
|---|---|---|
| JP | 2007-514179 A | 5/2007 |
| WO | 00/39623 A1 | 7/2000 |
| WO | 2005-022204 A2 | 3/2005 |

\* cited by examiner

CATADIOPTRIC OPTICAL SYSTEM AND IMAGE PICKUP APPARATUS HAVING THE SAME

BACKGROUND OF THE INVENTION

1. Field of the Invention

The present invention relates to a catadioptric optical system that is suitably used for magnifying a sample (an object) to be observed, and relates to an image pickup apparatus having the catadioptric optical system.

2. Description of the Related Art

In a current pathological examination, a pathological sample (a sample) is directly observed by the human eye using an optical microscope. Recently, a so-called virtual microscope that obtains an image of the pathological sample as image data to be observed on a display is used. In the virtual microscope, since the image data of the pathological sample can be observed on the display, a plurality of users can observe the data at the same time. In addition, there are many advantages in that for example the image data can be shared with a distant pathologist to be examined when this virtual microscope is used. However, this method has a problem that it takes time in order to taking the image of the pathological sample to be obtained as the image data.

One of reasons for taking time is that the pathological sample in a wide shooting area has to be obtained as image data using a narrow shooting area of the microscope. When the shooting area of the microscope is narrow, one image is obtained by taking a plurality of images or scanning images to connect them. In order to reduce the number of times of taking the images compared to a conventional microscope to shorten the time for obtaining the image data, an optical system (an image pickup optical system) that has a wide shooting area is required.

Additionally, an optical system that has a wide shooting area and that has a high resolution in a visible range (in a wide wavelength range) is required in observing the pathological sample. The optical system having the high resolution is required not only in the usage of the pathological examination but also in a variety of fields.

Japanese Examined Application Publication No. S60-034737 discloses an objective lens of a microscope that includes a catadioptric optical system and that appropriately reduces an aberration in whole of a visible light range, which is suitable for the observation of a living cell or the like.

Japanese Unexamined Application Publication (Translation of PCT Application) No. 2007-514179 discloses an ultra-wideband ultraviolet microscope video system that uses a catadioptric optical system and that has a high resolution in a broad ultraviolet wavelength range to examine a defect existing on an integrated circuit or a photo mask.

PCT international publication No. WO00/039623 discloses a catadioptric optical system that exposes a fine pattern in a broad area and that is suitable for manufacturing a semiconductor device.

The objective lens of the microscope that is disclosed in Japanese Examined Application Publication No. S60-034737 appropriately reduces various kinds of aberrations in whole of the visible light range, but the size of the observation area is not necessarily sufficient. A catadioptric imaging system of the wideband microscope that is disclosed in Japanese Unexamined Application Publication (Translation of PCT Application) No. 2007-514179 appropriately reduces the aberration over the wide wavelength range and has a high resolution, but the size of the visible area is not necessarily sufficient.

The catadioptric imaging optical system disclosed in PCT international publication No. WO00/039623 has a high resolution over a wide area, but the width of the wavelength range in which the aberration has been appropriately corrected is not necessarily sufficient. A microscope lens for magnifying and observing the sample requires a large observation area and a high optical performance in a wide wavelength range.

SUMMARY OF THE INVENTION

A catadioptric optical system as one of the present invention includes a first imaging optical system that includes a catadioptric part configured to collect a light beam from an object to form an intermediate image of the object, and a second imaging optical system that includes a refractive part configured to image the intermediate image on an image plane. The first imaging optical system includes a first optical element having a light transmission part around an optical axis and a reflection part including a surface as a reflection surface provided at an outer circumference side relative to the light transmission part and disposed at the object side, a second optical element having a light transmission part around the optical axis and a reflection part including a surface as a reflection surface provided at an outer circumference side relative to the light transmission part and disposed at the image side, and a negative lens in an optical path between the first optical element and the second optical element. The first optical element and the second optical element are disposed so that the reflection part of the first optical element and the reflection part of the second optical element face each other. The light beam from the object emits to a side of the second imaging optical system via the light transmission part of the first optical element, the negative lens, the reflection part of the second optical element, the negative lens, the reflection part of the first optical element, the negative lens, and the light transmission part of the second optical element, in order, and the following expressions are met:

$$0.1 < |\phi n/\phi 1| < 0.3$$

$$0.3 < R1n/R2n < 0.8$$

where $\phi n$ is a power of the negative lens, $R1n$ and $R2n$ are radii of curvature of lens surfaces of the negative lens at an object side and an image side, respectively, and $\phi 1$ is a power of the first imaging optical system.

An image pickup apparatus as another aspect of the present invention includes a light source unit, an illumination optical system configured to illuminate an object using a light beam from the light source unit, the catadioptric optical system configured to image the object, an image pickup element configured to perform a photoelectric conversion of an object image that is imaged by the catadioptric optical system, and an image processing system configured to generate image information based on data from the image pickup element.

Further features and aspects of the present invention will become apparent from the following description of exemplary embodiments with reference to the attached drawings.

DESCRIPTION OF THE PREFERRED EMBODIMENTS

Figure 1:
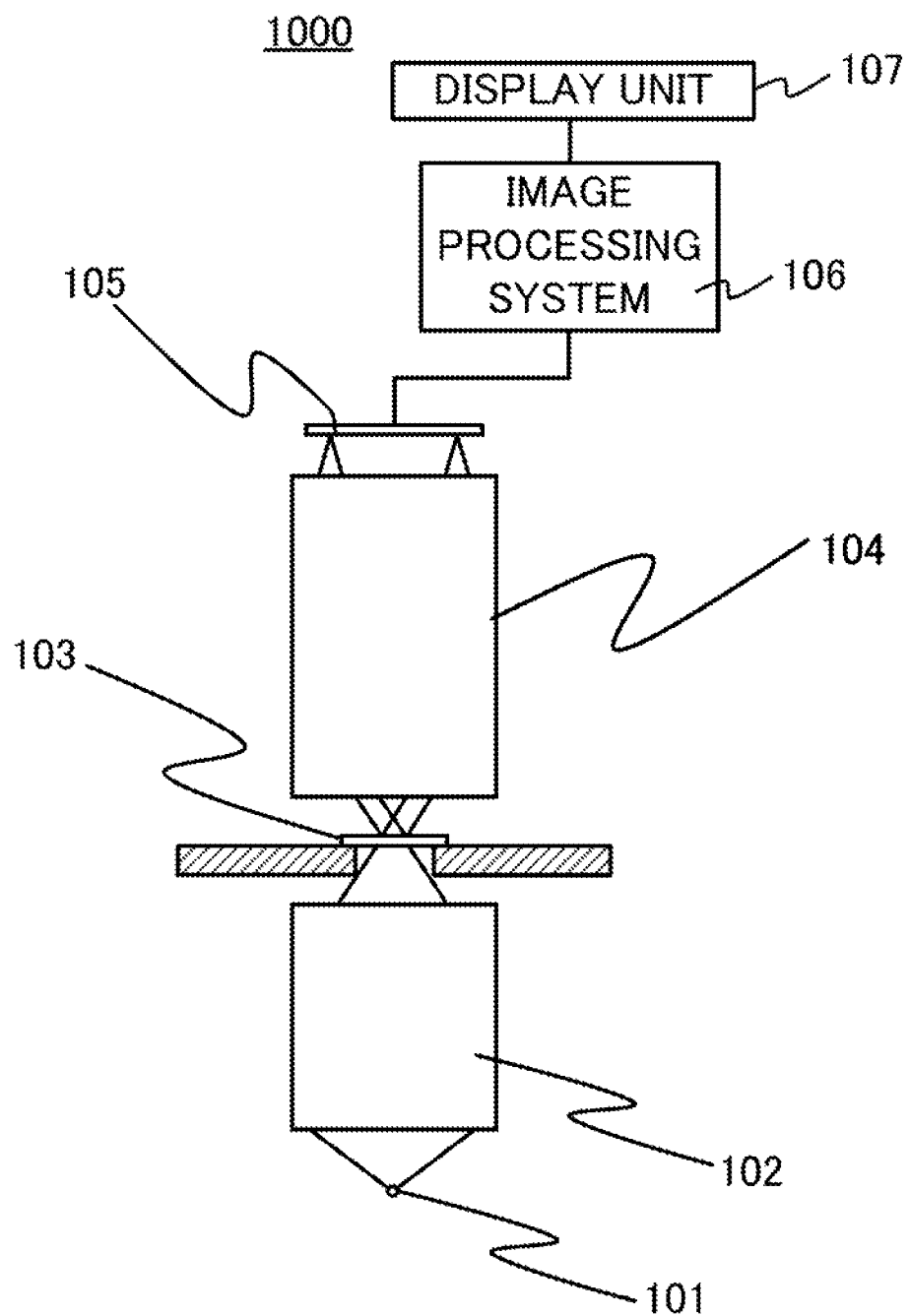
FIG. 1 is a schematic cross-sectional diagram of an image pickup apparatus in Embodiment 1.

Exemplary embodiments of the present invention will be described below with reference to the accompanied drawings. In each of the drawings, the same elements will be denoted by the same reference numerals and the duplicate descriptions thereof will be omitted.

A catadioptric optical system 104 of the present invention has a first imaging optical system G1 that includes a catadioptric part collecting a light beam from an object 103 to form an intermediate image IM of the object, and a second imaging optical system G2 that includes a refractive part imaging the intermediate image IM on an image plane 105. An image pickup apparatus 1000 of the present invention has a light source unit 101, an illumination optical system 102 that illuminates the object 103 using a light beam from the light source unit 101, and the catadioptric optical system 104 that images the object 103. In addition, the image pickup apparatus 1000 has an image pickup element 105 that performs a photoelectric conversion of an object image that is imaged by the catadioptric optical system 104, an image processing system 106 that generates image information based on data from the image pickup element 105, and a display unit 107 that displays image data generated by the image processing system 106.

The first imaging optical system G1 that constitutes the catadioptric optical system 104 of the present invention has a first optical element M1 that includes a light transmission part in the periphery of an optical axis and a reflection part in which a reflection film is provided on a surface at an outer circumference side relative to the light transmission part and at an object side. Furthermore, the first imaging optical system G1 has a second optical element M2 that includes a light transmission part in the periphery of the optical axis and a reflection part in which a reflection film is provided on a surface at an outer circumference side relative to the light transmission part and at an image side.

Embodiment 1

Hereinafter, referring to FIG. 1, the configuration of the image pickup apparatus 1000 that includes the catadioptric optical system 104 of the present invention will be described. FIG. 1 is a schematic cross-sectional diagram of the image pickup apparatus 1000 of the present invention. The image pickup apparatus 1000 collects light from the light source unit 101 using the illumination optical system 102 to illuminates the sample (the object) 103 uniformly. Visible light (for example, a wavelength of 400 nm to 700 nm) is used as light that is used in this case. As visible light, a light beam in a range of a wavelength of 486 nm to 656 nm only needs to be contained. The catadioptric optical system 104 forms an image of the sample (the object) 103 on the image pickup element 105. The data (the image information) obtained by the image pickup element 105 is used for generating the image data using the image processing system 106 to display the generated image data on the display unit 107 or the like. The generated image data is stored in a recording medium (a recording unit). In the image processing system 106, an appropriate processing such as an aberration correction processing in which an aberration that has not been corrected by the catadioptric optical system 104 is corrected or a synthesis processing in which the image data where imaging positions are different are connected to synthesize a piece of image data is performed.

Figure 2:
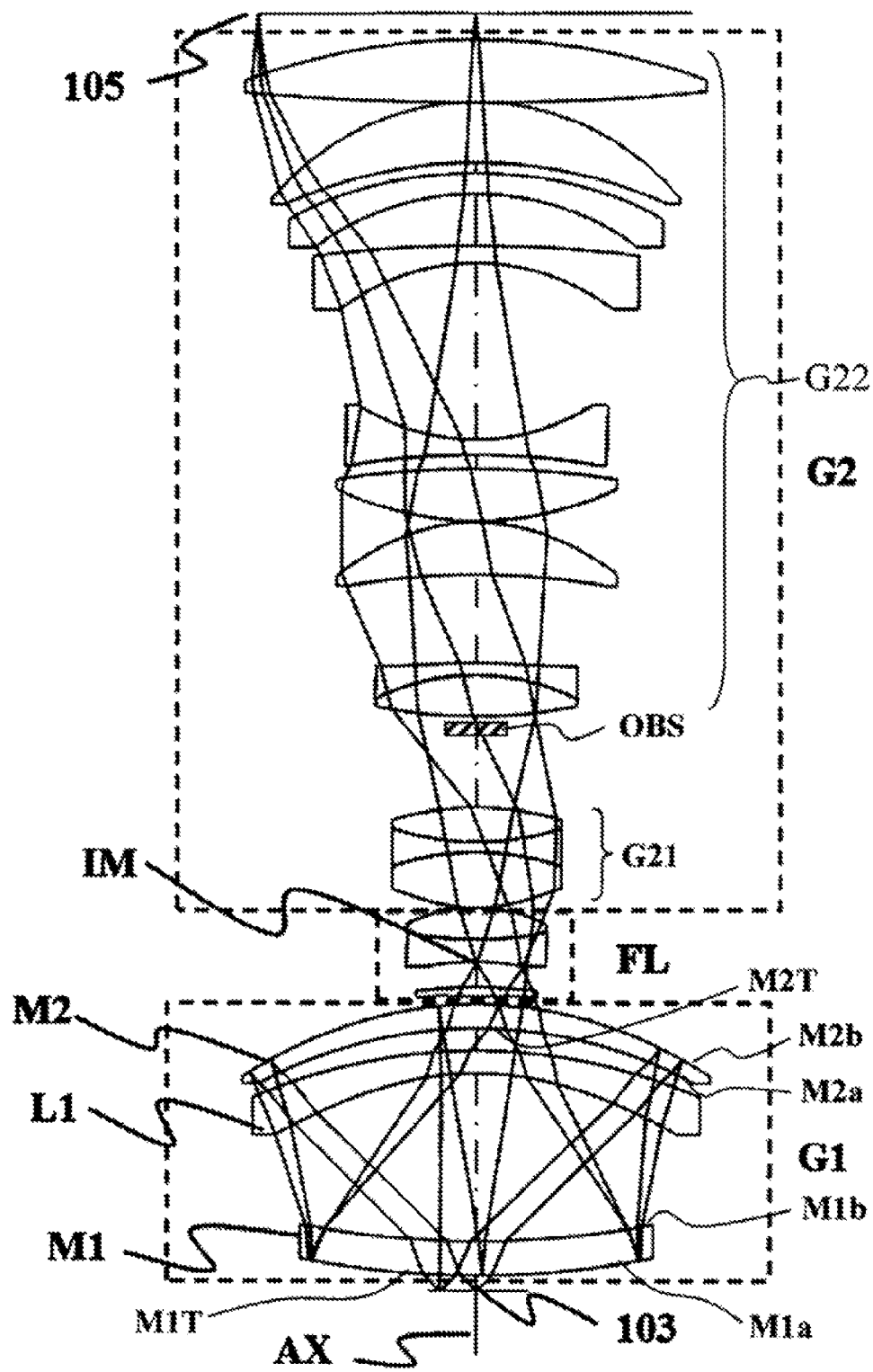
FIG. 2 is a schematic diagram of a main part of a catadioptric optical system in Embodiment 1.

FIG. 2 is a schematic diagram of describing the configuration of the catadioptric optical system 104 of FIG. 1. In FIG. 2, reference numeral 104A (reference numerals 104B and 104C in other embodiments) is a catadioptric optical system, reference numeral 103 denotes an object plane on which the sample is disposed, and reference numeral 105 denotes an image plane on which the image pickup element is disposed. Reference code AX denotes an optical axis of the catadioptric optical system 104A. The catadioptric optical system 104A has a first imaging optical system G1 including a reflection surface that collects the light beam from the object 103 to form an intermediate image IM on a predetermined plane.

A field lens unit FL is disposed at a position on which the intermediate image IM is formed. The field lens unit FL efficiently introduces the light beam from the intermediate image IM into a second imaging optical system G2. The field lens unit FL does not have to be provided. The catadioptric optical system 104A has the second imaging optical system G2 that includes a refractive surface and a light obscuration part OBS that forms the intermediate image IM on the image plane 105.

The first imaging optical system G1 has a first optical element (a Mangin mirror) M1, a negative lines L1, and a second optical element (a Mangin mirror) M2, in order from the object side. The first optical element M1 has a concentric shape or a substantially concentric shape. The Abbe number of a material of the negative lens L1 is greater than the Abbe number of a material of the second optical element M2. The second imaging optical system G2 has a lens unit G21, a light obscuration part OBS, and a lens unit G22, in order from the object side.

FIG. 2 illustrates a light beam that leads from the object plane 103 to the image plane 105. The first optical element M1 of the first imaging optical system G1 has a light emission part M1T including a surface M1a having a convex shape at the side of the object 103 and a surface M1b having a concave shape at the side of the image side, which has a positive refractive power in the vicinity of the optical axis and around the optical axis, and a reflection part having a reflection film on the surface M1a at the outer circumference side relative to the light transmission part M1T and at the object side. The surface M1a has an aspherical surface. The negative lens L1 includes a surface having a concave and aspherical surface at the object side. The negative lens L1 has a meniscus shape and a whole of the surface is a light emission surface.

The second optical element M2 has a meniscus shape facing a concave surface toward the object side, which includes a light transmission part M2T having a positive refractive power around the optical axis and a reflection part in which a reflection film is provided on a surface M2b at the outer circumference side relative to the light emission part M2T and at the image side. Reference numeral M2a denotes a surface of the second optical element M2 at the object side, and the surface M2b has an aspherical shape. The first optical element M1 and the second optical element M2 are disposed so that the reflection parts M1a and M2b face each other. The second imaging optical system G2 obscures the light beam near the optical axis of the light beams from the object 103, and a light obscuring plate OBS that prevents the light beam entering the image pickup element 105 is disposed in the second imaging optical system G2 or at or near an aperture stop.

In the catadioptric optical system 104A illustrated in FIG. 2, the light beam that is emitted from the sample 103 illuminated from the illumination optical system 102 passes through a central transmission part M1T of the first optical element M1. Then, the light beam passes through the negative lens L1 and is diverged to enter the refractive surface M2a of the second optical element M2. Then, the light beam is reflected to be collected by the reflection part M2b and passes through the refractive surface M2a and the negative lens L1 to enter the refractive surface M1b of the first optical element M1. Then, the light beam is reflected on the reflection part M1a of the first optical element M1. Subsequently, the light beam passes through the refractive surface M1b and the negative lens L1 and passes through the central transmission part M2T of the second optical element M2 to be emitted to the side of the second imaging optical system G2. Then, the intermediate image IM of the sample 103 is formed near the field lens unit FL.

In the present embodiment, a configuration in which the intermediate image IM is formed without disposing the field lens unit FL may also be applied. A divergent light beam from the intermediate image IM passes through a lens unit G21 having a positive refractive power and a lens unit G22 having a positive refractive power, and enters the image plane 105. Thus, the image of the object 103 is magnified and imaged on the image plane 105. The image of the object 103 imaged on the image pickup element 105 is processed by the image processing system 106 to be displayed on the display unit 107.

The characteristics of the first imaging optical system G1 that forms the intermediate image IM of the present embodiment will be described. The negative lens L1 is disposed between optical paths of the first optical element M1 that is configured by the Mangin mirror and the second optical element M2 that is configured by the Mangin mirror. As a result, a spherical aberration that is generated in the first imaging optical system G1 can be easily corrected. In the embodiment, a diameter (hereinafter, referred to as an effective diameter) of the first optical element M1 is defined as H1, and an effective diameter of the transmission part of the first optical element M1 is defined as H2. The light from the object 103 passes through the light transmission part M1T of the first optical element M1 and the negative lens L1, and then it is reflected by the surface M2b of the second optical element M2.

Subsequently, it enters the negative lens L1 again, and therefore an angle of the light beam entering the first optical element M1 becomes smaller with reference to the optical axis. Thus, the diameter H1 of the first optical element M1 becomes larger, and a ratio H2/H1 with respect to the diameter H2 of the transmission part when the light beam from the object plane 103 enters the first optical element M1 is decreased. In other words, a central obscuration ratio on the optical axis AX is suppressed to be reduced, and as a result the deterioration of the image performance is prevented.

In each embodiment, a power of the negative lens L1 is defined as $\phi n$, radius of curvature of lens surfaces at the negative lens L1 at the object side and the image side are defined as R1n and R2n, respectively. A power of the first imaging optical system G1 defined as $\phi 1$. In this case, the following Conditional Expressions (1) and (2) are met.

$$0.1 < |\phi n/\phi 1| < 0.3 \tag{1}$$

$$0.3 < R1n/R2n < 0.8 \tag{2}$$

Conditional Expression (1) mainly contributes to the reduction of a chromatic aberration that is generated in the first imaging optical system G1. When a value is greater than the upper limit of Conditional Expression (1), the power of the negative lens L1 is so strong and the aberration generated by the negative lens L1 is so much that the correction of this aberration is difficult. In order to correct the aberration that is generated by the negative lens L1, the power of the second optical element M2 needs to be strengthened, and as a result, it is difficult to ensure the thickness of the lens edge of the second optical element M2. On the other hand, when a value is smaller than the lower limit of Conditional Expression (1), the power of the negative lens L1 is so weak and the central obscuration ratio H2/H1 increases, and it is not preferable because the image performance is deteriorated.

Conditional Expression (2) relates to a ratio of the radii of curvature of the lens surfaces of the negative lens L1 at the object side and the image side, which mainly contributes to the reductions of the spherical aberration and the coma aberration. When a value is outside the range of Conditional Expression (2), it is not preferable because the corrections of the spherical aberration and the coma aberration are difficult.

In each embodiment, it is more preferred that at least one of the following various conditions be met.

The radius of curvature of the reflection part of the first optical element M1 is defined as M1R. The radius of curvature of the reflection part of the second optical element M2 is defined as M2R.

A focal length of the first imaging optical system G1 is defined as f1. A distance from the surface of the first optical element M1 at the image side to the surface of the negative lens L1 at the object side is defined as t1, and a distance from the negative lens L1 at the image side to the surface of the second optical element M2 at the object side is defined as t2.

The Abbe numbers of the first and second optical elements M1 and M2 and the negative lens L1 are defined as v1, v2, and vn, respectively. A refractive index of the material of the negative lens L1 is defined as n.

The radii of curvature of the surfaces of the first optical element M1 at the object side and the image side are defined as r1 and r2, respectively.

A power of the second imaging optical system G2 is defined as $\phi 2$.

In this case, it is preferred that at least one of the following Conditional Expressions (3) to (10) be met.

$$-3.5 < M1R/M2R < -2.0 \tag{3}$$

$$0.6 < t1/f1 < 1.0 \tag{4}$$

$$0.01 < t2/t1 < 0.20 \tag{5}$$

$$0.40 < v1/v2 < 1.60 \tag{6}$$

$$0.5 < v2/vn \leq 1.0 \tag{7}$$

$$1.50 < n < 1.70 \tag{8}$$

$$0.40 < r1/r2 < 1.00 \tag{9}$$

$$0.10 < \phi 2/\phi 1 < 0.30 \tag{10}$$

Conditional Expression (3) relates to a ratio of the radii of curvature of the reflection parts of the first and second optical elements M1 and M2, which mainly contributes to the reduction of an axial chromatic aberration. When a value is outside the range of Conditional Expression (3), it is not preferable because the correction of the axial chromatic aberration is difficult. When a value is smaller than the lower limit of Conditional Expression (3), it is not preferable because the central obscuration ratio becomes large. On the other hand, when a value is greater than the upper limit of Conditional Expression (3), it is not preferable because the diameter of the light beam becomes large and the diameter of the first optical element M1 is enlarged.

Conditional Expression (4) relates to a position of the negative lens L1 in the optical path, which mainly contributes to the reductions of the central obscuration ratio and the size of the optical element. When a value is smaller than the lower limit of Conditional Expression (4), it is not preferable because the central obscuration ratio becomes large and the image quality is deteriorated. On the other hand, when a value is greater than the upper limit of Conditional Expression (4), it is not preferable because the diameter of the second optical element M2 is enlarged and the total length is also extended.

Conditional Expression (5) relates to a position of the negative lens L1 in the optical path, which mainly contributes to the reductions of the spherical aberration, the coma aberration, and the axial chromatic aberration. When a value is greater than the upper limit of Conditional Expression (5), it is not preferable because the corrections of the spherical aberration, the coma aberration, and the axial chromatic aberration at the same time are difficult. On the other hand, when a value is smaller than the lower limit of Conditional Expression (5), it is not preferable because the negative lens L1 and the second optical element M2 tend to mechanically interfere with each other.

Conditional Expression (6) relates to a ratio of the Abbe numbers of the materials of the first and second optical elements M1 and M2, which mainly contributes to correct the chromatic aberration appropriately. When a value is smaller than the lower limit or greater than the upper limit of Conditional Expression (6), it is not preferable because the correction of the axial chromatic aberration is difficult or an appropriate optical material does not exist.

Conditional Expression (7) contributes to the reduction of the chromatic aberration that is generated in the first imaging optical system G1. When a value is smaller than the lower limit or greater than the upper limit of Conditional Expression (7), it is not preferable because the chromatic aberration, particularly the axial chromatic aberration, which is generated in the first imaging optical system G1 is enlarged and therefore many lenses are required to cancel the aberration by the second imaging optical system G2.

Conditional Expression (8) relates to the refractive index of the material of the negative lens L1, which mainly contributes to the reductions of the field curvature and the chromatic aberration. It is not preferable that a value is smaller than the lower limit of Conditional Expression (8) because the field curvature is corrected too much, and also it is not preferable that a value is greater than the upper limit of Conditional Expression (8) because the correction of the field curvature is insufficient. When a value is outside the range of Conditional Expression (8), it is not preferable because the Abbe number of the usable optical material is limited and therefore the correction of the axial chromatic aberration is difficult.

Conditional Expression (9) indicates that the shape of the first optical element M1 is a substantially concentric shape. When a value is outside the range of Conditional Expression (9), it is not preferable because the axial chromatic aberration is generated.

Conditional Expression (10) relates to a ratio of the powers (the refractive powers) of the first and second optical systems G1 and G2, which mainly contributes to the reduction of the field curvature. When a value is outside the range of Conditional Expression (10), it is not preferable because it is difficult to keep the field curvature small and also to obtain a desired lateral magnification.

In the catadioptric optical system of the present embodiment, the concave surface of the negative lens L1 has an aspherical shape. As a result, the spherical aberration and the coma aberration are appropriately corrected. In the catadioptric optical system of the present embodiment, the reflection surfaces M1$a$ and M2$b$ of the first and second optical elements M1 and M2 have an aspherical shape. As a result, the spherical aberration and the coma aberration are corrected more appropriately. The catadioptric optical system of the present embodiment has a field area having a diameter $\phi$ greater than or equal to 3 mm on condition that numerical examples described below are indicated by mm unit. When the field area is smaller than 3 mm, it is not preferable because the number of times of taking images required in taking division images for the entire object plane increases and the time required for taking the entire image becomes long.

The field area is set to be greater than or equal to $\phi 3$ mm to easily shorten the image pickup time since the division number of the division images is reduced. It is more preferred that the field area be greater than or equal to $\phi 10$ mm, and it is easy to greatly reduce the image pickup time since the object plane is easily taken at once.

In the present embodiment, each of the reflection parts of the back surfaces of the first and second optical elements M1 and M2 has a concave and aspherical shape. The concave surface of the negative lens L2 also has an aspherical shape. Thus, three aspherical shapes are used to reduce the generation of various kinds of aberrations such as the spherical aberration and the coma aberration without increasing the chromatic aberration.

In the catadioptric optical system 104A of Embodiment 1, the numerical aperture at the object side is 0.7, the magnification is six times, the object height is 14.14 mm, and the field area is $\phi 28.28$ mm. The field area meets the requirement that the diameter is greater than or equal to $\phi 3$ mm and also meets the requirement that the diameter is greater than or equal to $\phi 10$ mm.

At both the object side and the image side, a substantially telecentric optical system is obtained. A wavefront aberration by white light that covers the range of a wavelength of 486 nm to 656 nm in the visible range can be suppressed to value that is smaller than or equal to 50 m$\lambda$rms.

Figure 3:
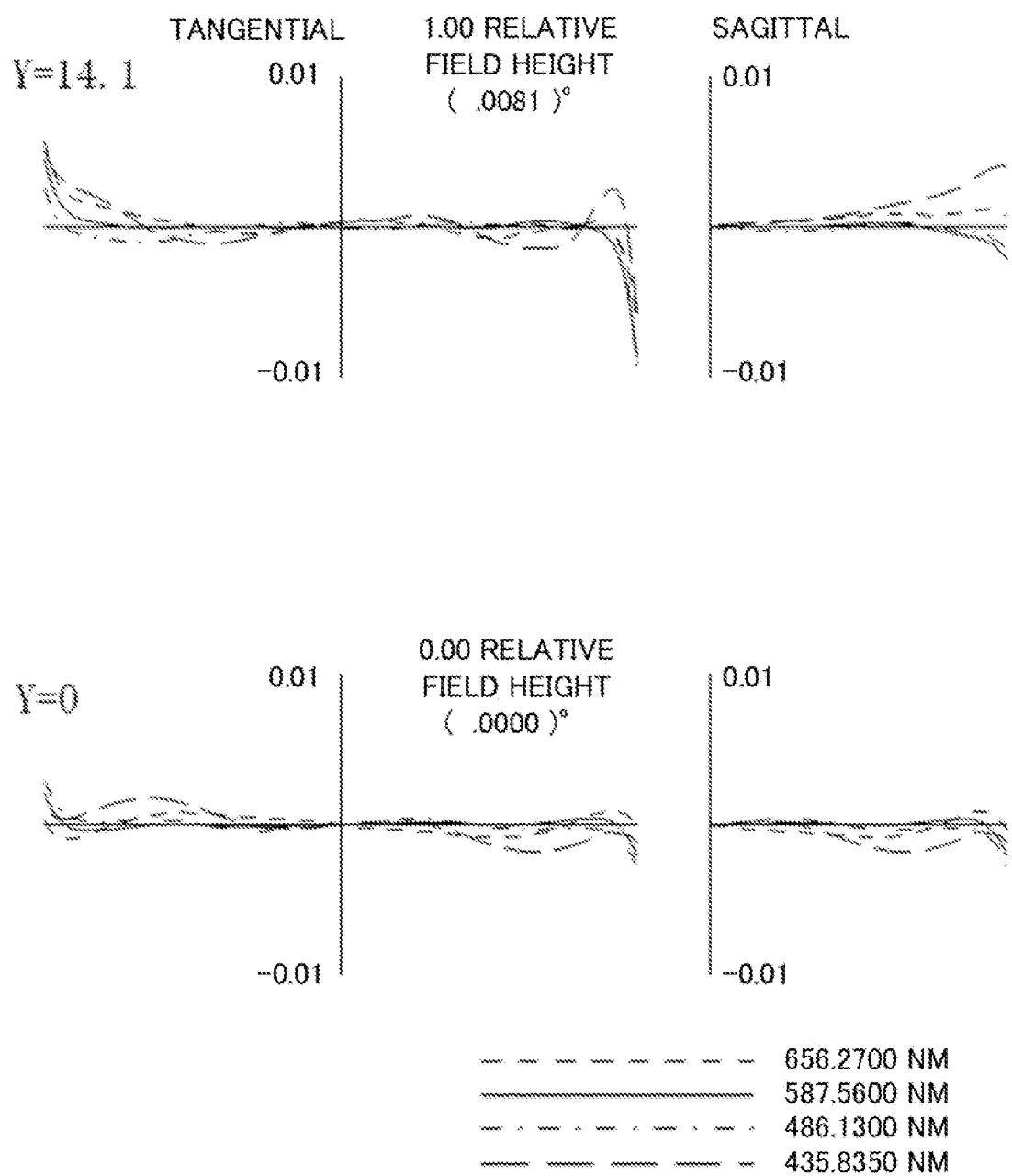
FIG. 3 is an aberration diagram of the catadioptric optical system in Embodiment 1.

FIG. 3 illustrates the lateral aberration on the image plane (on the surface of the image pickup element) of Embodiment 1, and the aberration is appropriately corrected in a wide wavelength range of the visible range for both the on-axis and off-axis conditions. In the aberration diagram, symbol Y denotes an image height.

A ratio $\nu 2/\nu n$ of the Abbe number $\nu n$ of the material of the negative lens L1 and the Abbe number $\nu 2$ of the material of the second optical element M2 is 0.60, and therefore Conditional Expression (7) is met.

In addition, the value of the power $\phi n$ of the negative lens L1 is −0.0018 and the value of the power $\phi 1$ of the first imaging optical system G1 is 0.01181, and therefore Conditional Expression (1) is met.

Embodiment 2

Figure 4:
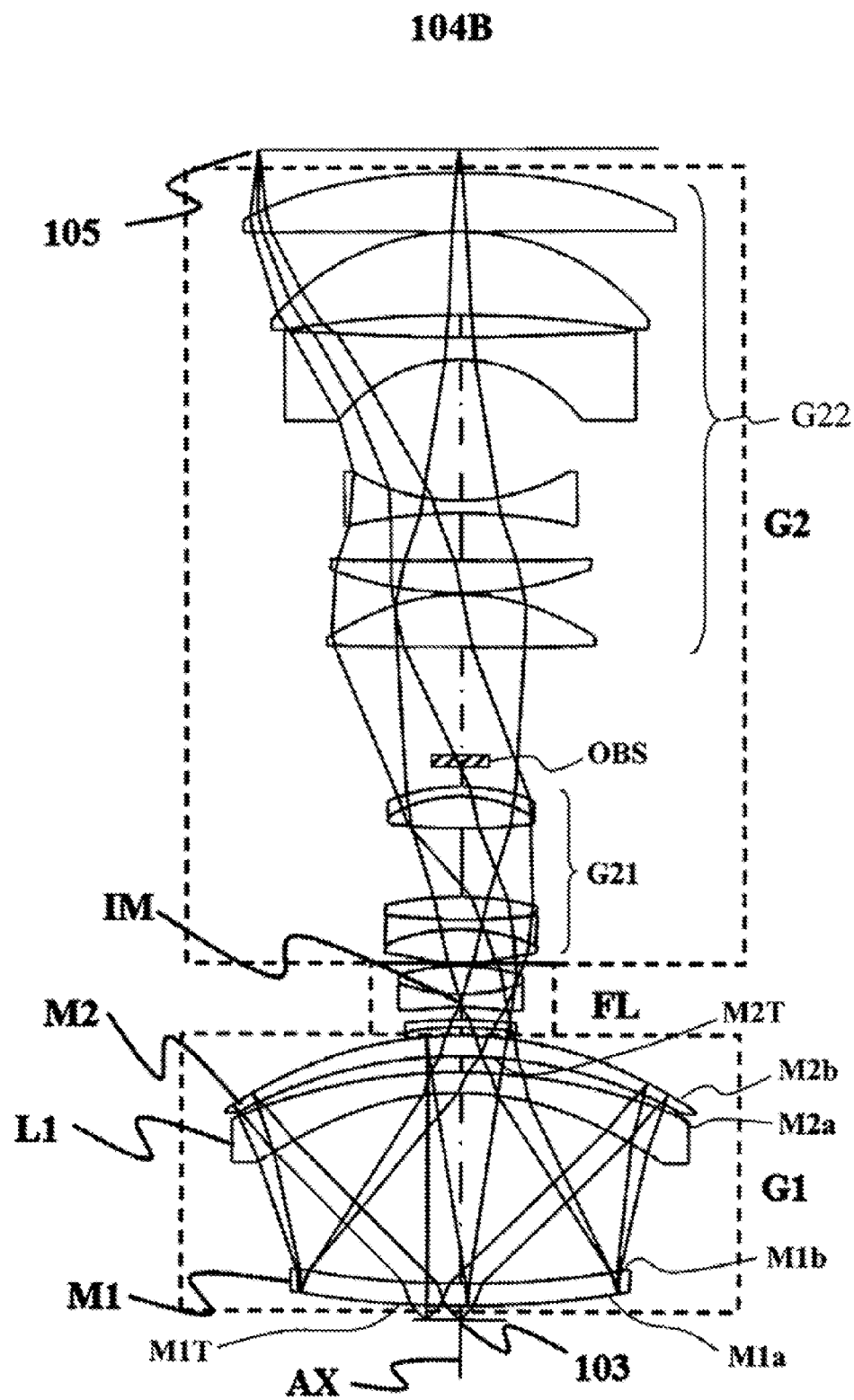
FIG. 4 is a schematic diagram of a main part of a catadioptric optical system in Embodiment 2.

A catadioptric optical system of Embodiment 2 illustrated in FIG. 4 will be described. The descriptions of the same configurations as those of Embodiment 1 are omitted. In the catadioptric optical system of Embodiment 2, the numerical aperture at the object side is 0.7, the magnification is six times, the object height is 14.14 mm, and the field area is φ28.28 mm. The field area meets the requirement that the diameter is greater than or equal to φ3 mm, and also meets the requirement that the diameter is greater than or equal to φ10 mm. At both the object side and the image side, a substantially telecentric optical system is obtained. A wavefront aberration by white light that covers the range of a wavelength of 486 nm to 656 nm in the visible range can be suppressed to a value that is smaller than or equal to 50 mλrms.

Figure 5:
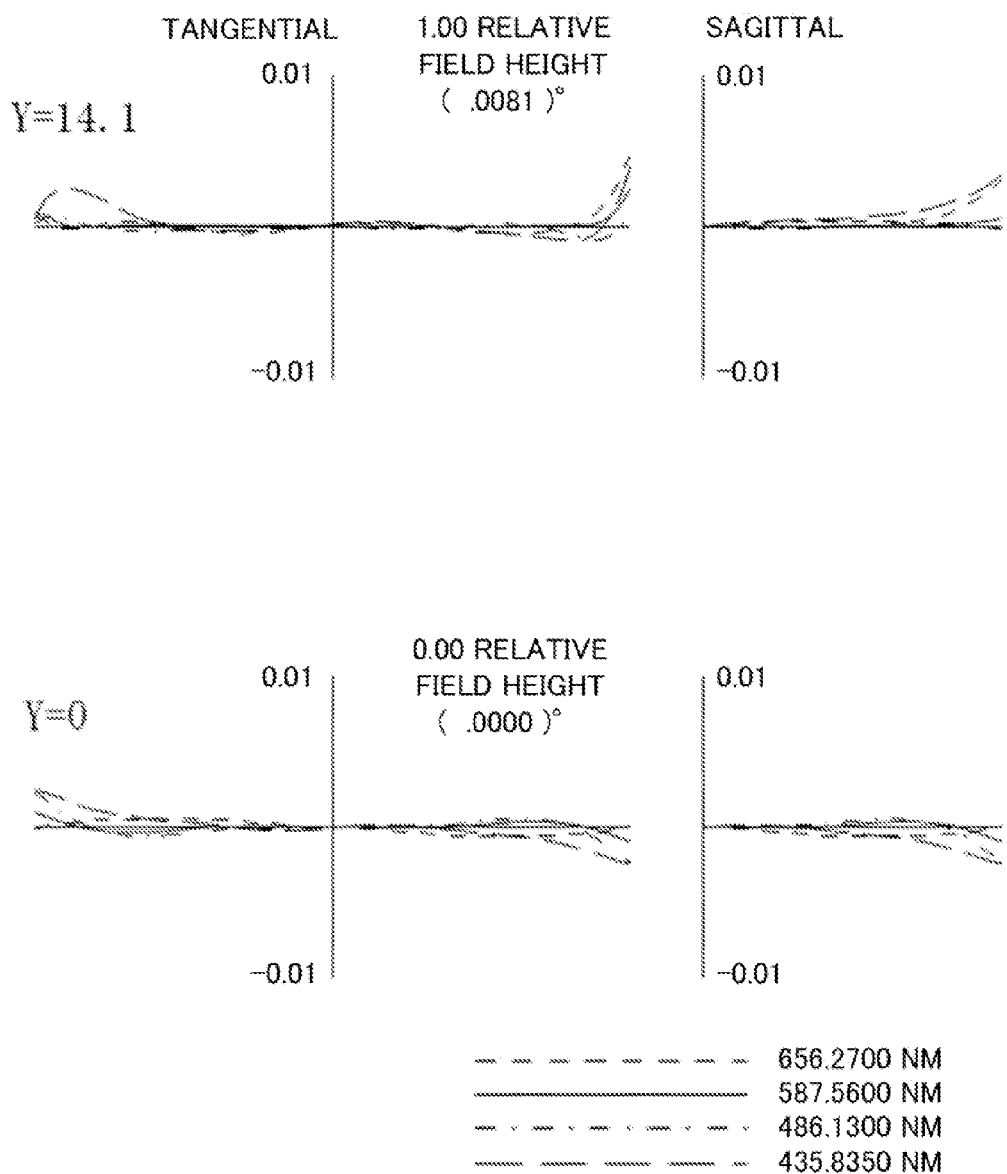
FIG. 5 is an aberration diagram of the catadioptric optical system in Embodiment 2.

FIG. 5 illustrates the lateral aberration on the image plane (on the surface of the image pickup element) of Embodiment 2, and the aberration is appropriately corrected in a wide wavelength range of the visible range for both the on-axis and off-axis conditions. A ratio ν2/νn of the Abbe number νn of the material of the negative lens L1 and the Abbe number ν2 of the material of the second optical element M2 is 0.84, and therefore Conditional Expression (7) is met. In addition, the value of the power φn of the negative lens L1 is −0.0021 and the value of the power φ1 of the first imaging optical system G1 is 0.01099, and therefore Conditional Expression (1) is met.

Embodiment 3

Figure 6:
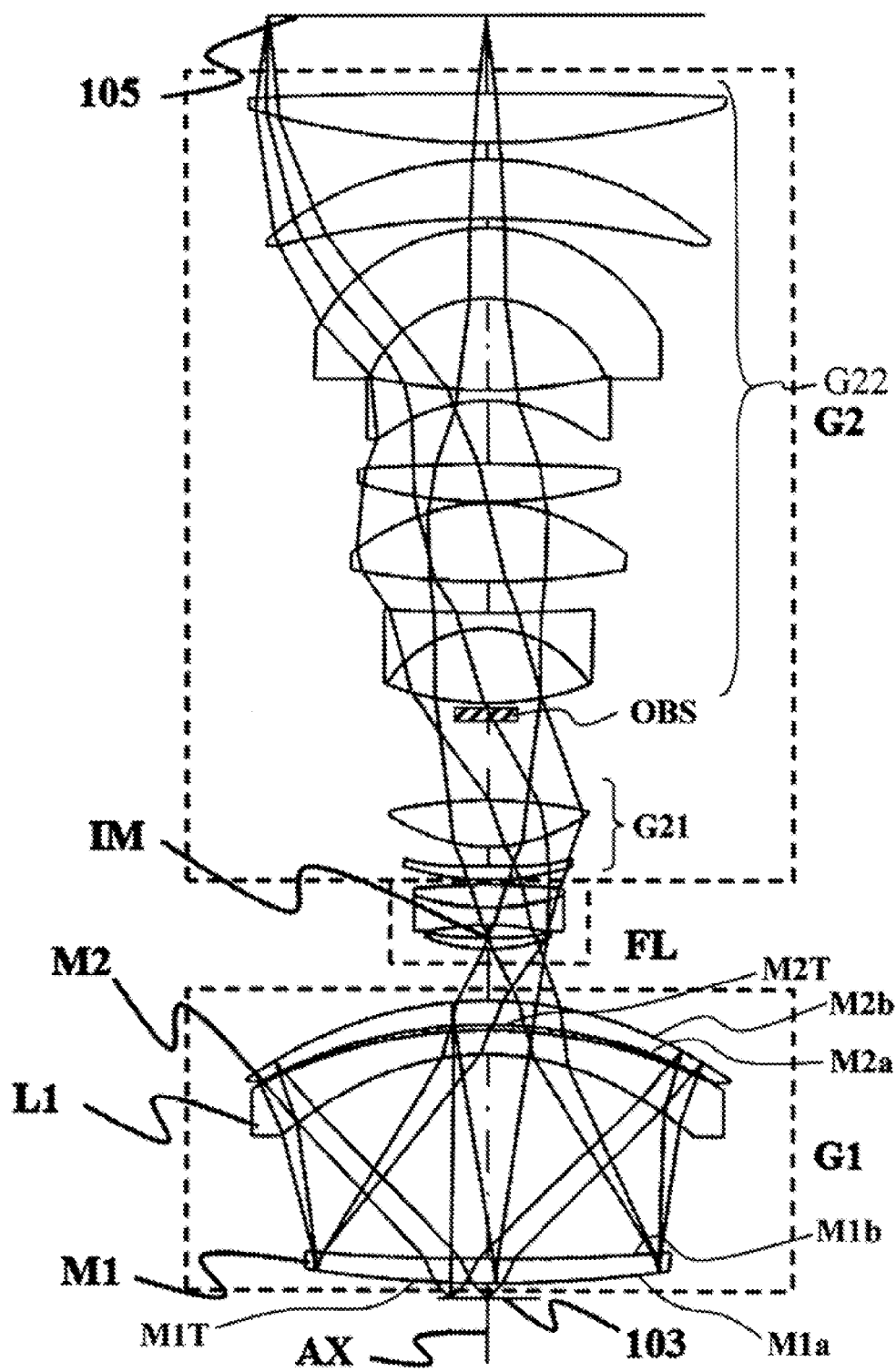
FIG. 6 is a schematic diagram of a main part of a catadioptric optical system in Embodiment 3.

A catadioptric optical system of Embodiment 3 illustrated in FIG. 6 will be described. The descriptions of the same configurations as those of Embodiment 1 are omitted.

In the catadioptric optical system of Embodiment 3, the numerical aperture at the object side is 0.7, the magnification is six times, the object height is 14.14 mm, and the field area is φ28.28 mm. The field area meets the requirement that the diameter is greater than or equal to φ3 mm, and also meets the requirement that the diameter is greater than or equal to φ10 mm. At both the object side and the image side, a substantially telecentric optical system is obtained. A wavefront aberration by white light that covers the range of a wavelength of 486 nm to 656 nm in the visible range can be suppressed to a value that is smaller than or equal to 50 mλrms.

Figure 7:
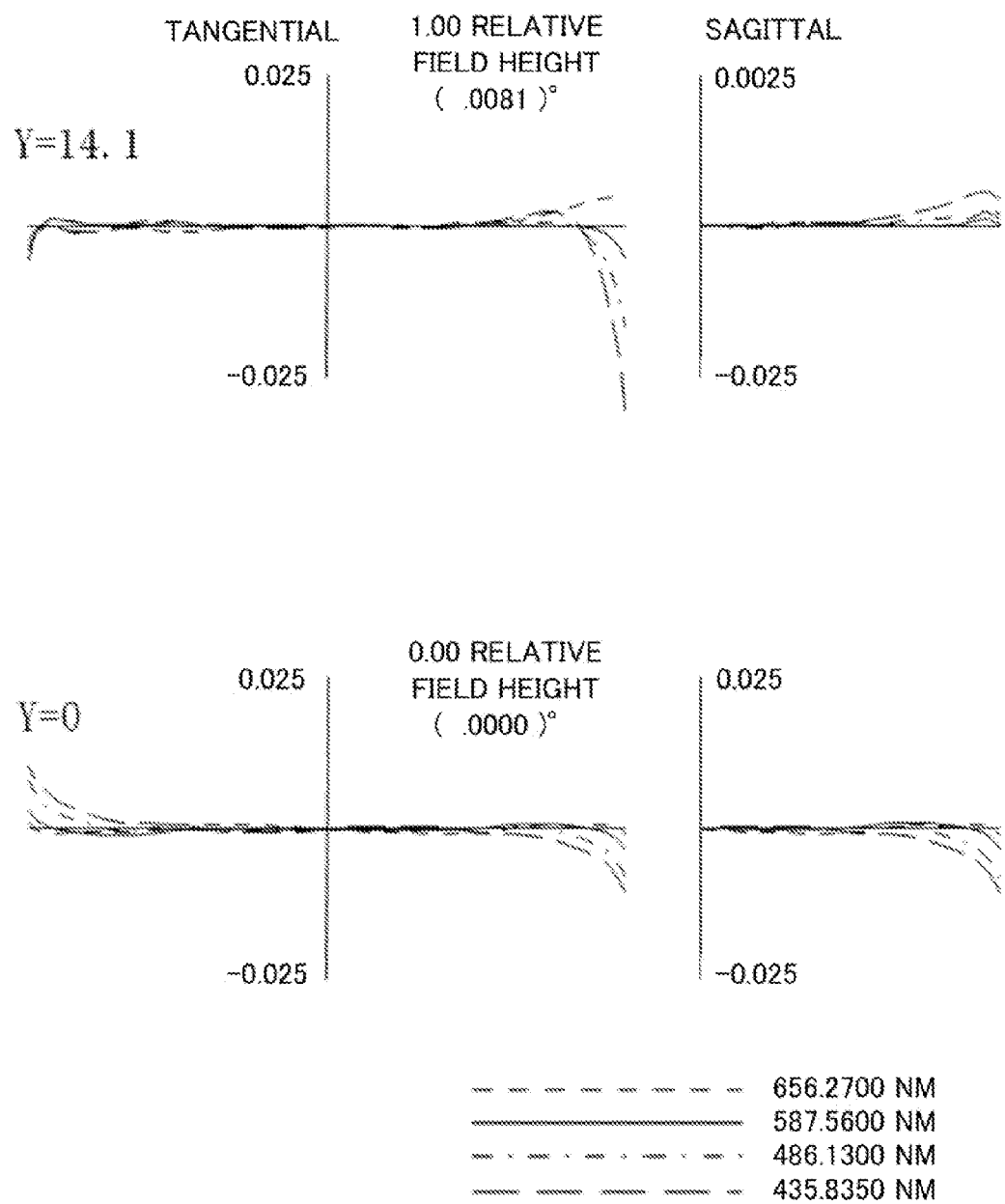
FIG. 7 is an aberration diagram of the catadioptric optical system in Embodiment 3.

FIG. 7 illustrates the lateral aberration on the image plane (on the surface of the image pickup element) of Embodiment 3, and the aberration is appropriately corrected in a wide wavelength range of the visible range for both the on-axis and off-axis conditions. A ratio ν2/νn of the Abbe number νn of the material of the negative lens L1 and the Abbe number ν2 of the material of the second optical element M2 is 0.71, and therefore Conditional Expression (7) is met. In addition, the value of the power φn of the negative lens L1 is −0.0027 and the value of the power T1 of the first imaging optical system G1 is 0.011588, and therefore Conditional Expression (1) is met.

As described above, according to each of the embodiments, a catadioptric optical system that reduces the aberrations over entire visible light range with high NA and that has a wide field area, and an image pickup apparatus using the catadioptric optical system can be obtained. While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions. For example, the present invention can be applied to the image pickup apparatus that scans a large screen, and can also be applied to the image pickup apparatus that does not scan the large screen.

Numerical embodiments of each embodiment will be described as follows. The surface number denotes an optical surface that is counted in order of light passing from an object plane (a sample surface) to an image plane. Symbol r denotes a radius of curvature of an i-th optical surface (Unit: mm). Symbol d denotes an interval between the i-th optical surface and (i+1)th optical surface (Unit: mm), and the sign indicates a positive when the measurement is performed from the object side to the image side, i.e. the direction in which the light travels, and it indicates a negative when the direction is the opposite. Symbols Nd and νd denote a refractive index of the material and the Abbe number with respect to a wavelength of 587.6 nm, respectively. The aspherical shape is represented by an expression of a general aspherical surface that is indicated by the following expression. In the following expression, symbol Z denotes a coordinate in an optical axis direction, symbol c denotes a curvature (the inverse of the radius of curvature r), symbol h denotes a height from the optical axis, symbol k denotes a conic constant, and symbols A, B, C, D, E, F, G, H, J, . . . denote aspherical surface coefficients of 4th, 6th, 8th, 10th, 12th, 14th, 16th, 18th, 20th, . . . , respectively.

$$Z = \frac{ch^2}{1 + \sqrt{(1+k)\,c^2h^2}} + Ah^4 + Bh^6 +$$
$$Ch^8 + Dh^{10} + Eh^{12} + Fh^{14} + Gh^{16} + Hh^{18} + Jh^{20} + \ldots$$

Symbol "E-X" means "$10^{-x}$". Tables 1 to 3 indicate the conic constant k and the aspherical surface coefficients A, B, C, D, E, F, G, H, and J for the surface numbers of Numerical examples 1 to 3, respectively. Table 4 indicates a relationship between optical constants of each element in each embodiment and Numerical examples 1 to 3. Table 5 indicates a relationship between each conditional expression and Numerical examples 1 to 3.

Numerical Example 1

| Surface number | r | d | Nd | νd |
|---|---|---|---|---|
| Object plane |  | 6.00 |  |  |
| 1 | 337.13 | 13.70 | 1.8052 | 25.43 |
| 2 | 374.52 | 65.18 |  |  |
| 3 | −120.72 | 9.20 | 1.5237 | 60.10 |
| 4 | −213.77 | 8.82 |  |  |
| 5 | −174.37 | 9.49 | 1.5889 | 35.83 |
| 6 | −152.43 | −9.49 | 1.5889 | 35.83 |
| 7 | −174.37 | −8.82 |  |  |
| 8 | −213.77 | −9.20 | 1.5237 | 60.10 |
| 9 | −120.72 | −65.18 |  |  |
| 10 | 374.52 | −13.70 | 1.8052 | 25.43 |
| 11 | 337.13 | 13.70 | 1.8052 | 25.43 |
| 12 | 374.52 | 65.18 |  |  |
| 13 | −120.72 | 9.20 | 1.5237 | 60.10 |
| 14 | −213.77 | 8.82 |  |  |
| 15 | −174.37 | 9.49 | 1.5889 | 35.83 |
| 16 | −152.43 | 3.00 |  |  |
| 17 | 983.84 | 3.61 | 1.8040 | 46.58 |
| 18 | −206.61 | 9.98 |  |  |
| 19 | −87.23 | 8.91 | 1.7395 | 27.33 |
| 20 | 136.90 | 12.01 | 1.8040 | 46.58 |
| 21 | −70.30 | 0.50 |  |  |
| 22 | 60.02 | 21.77 | 1.8040 | 46.58 |
| 23 | −103.47 | 3.64 | 1.7346 | 27.49 |
| 24 | 106.25 | 13.87 | 1.8040 | 46.58 |
| 25 | −115.15 | 35.52 |  |  |
| 26 | 175.99 | 16.45 | 1.8041 | 44.96 |
| 27 | −88.70 | 4.48 | 1.7208 | 27.99 |
| 28 | −423.28 | 34.79 |  |  |
| 29 | −291.12 | 20.41 | 1.8044 | 37.17 |

-continued

| Surface number | r | d | Nd | vd |
|---|---|---|---|---|
| 30 | −74.03 | 0.50 | | |
| 31 | 127.61 | 20.29 | 1.8040 | 46.58 |
| 32 | −373.57 | 5.61 | | |
| 33 | −351.62 | 6.26 | 1.7799 | 28.92 |
| 34 | 86.74 | 68.63 | | |
| 35 | −88.66 | 6.60 | 1.5934 | 35.24 |
| 36 | −554.01 | 20.77 | | |
| 37 | −103.78 | 7.72 | 1.6578 | 56.16 |
| 38 | −170.99 | 4.05 | | |
| 39 | −181.71 | 23.65 | 1.8040 | 46.58 |
| 40 | −103.36 | 0.50 | | |
| 41 | 1023.54 | 24.07 | 1.8040 | 46.58 |
| 42 | −289.07 | 10.00 | | |
| Image plane | | | | |

TABLE 1

| Surface number | k | A | B | C | D |
|---|---|---|---|---|---|
| 1, 11 | 0.00E+00 | −9.89E−09 | 1.27E−13 | −7.80E−17 | 1.31E−20 |
| 3, 9, 13 | 0.00E+00 | 1.13E−07 | 3.42E−12 | 3.37E−16 | −1.64E−20 |
| 6, 16 | 3.60E−01 | 3.06E−08 | 1.10E−12 | 6.41E−17 | 9.78E−22 |
| 17 | 0.00E+00 | −1.49E−06 | −2.02E−10 | 1.78E−14 | 7.69E−16 |
| 19 | 0.00E+00 | 3.95E−06 | −5.28E−09 | 7.87E−12 | −8.77E−15 |
| 22 | 0.00E+00 | −2.82E−06 | 1.03E−09 | −1.09E−12 | 9.08E−16 |
| 28 | 0.00E+00 | 3.58E−07 | 6.24E−11 | −8.56E−14 | 8.23E−17 |
| 30 | 0.00E+00 | 2.85E−07 | 4.41E−12 | 1.17E−14 | −2.14E−18 |
| 33 | 0.00E+00 | −7.58E−10 | −1.02E−10 | 3.93E−14 | −1.53E−17 |
| 38 | 0.00E+00 | 1.17E−09 | −1.75E−11 | 1.56E−15 | 1.53E−19 |
| 42 | 0.00E+00 | −5.72E−08 | 7.68E−12 | 7.20E−16 | −4.54E−19 |

| Surface number | E | F | G | H | J |
|---|---|---|---|---|---|
| 1, 11 | −2.12E−24 | 1.95E−28 | −6.99E−33 | 0.00E+00 | 0.00E+00 |
| 3, 9, 13 | 7.19E−25 | 7.88E−29 | −1.02E−32 | 0.00E+00 | 0.00E+00 |
| 6, 16 | 1.14E−25 | 2.56E−30 | 1.33E−34 | 0.00E+00 | 0.00E+00 |
| 17 | −2.65E−18 | 2.14E−21 | 0.00E+00 | 0.00E+00 | 0.00E+00 |
| 19 | 4.76E−18 | −5.26E−29 | 0.00E+00 | 0.00E+00 | 0.00E+00 |
| 22 | −4.88E−19 | 1.31E−22 | −1.00E−26 | 0.00E+00 | 0.00E+00 |
| 28 | −5.35E−20 | 1.98E−23 | −3.14E−27 | 0.00E+00 | 0.00E+00 |
| 30 | 6.95E−22 | −1.12E−25 | 1.47E−29 | 0.00E+00 | 0.00E+00 |
| 33 | 4.61E−21 | −8.62E−25 | 7.52E−29 | 0.00E+00 | 0.00E+00 |
| 38 | −1.02E−22 | 1.38E−26 | −6.87E−31 | 0.00E+00 | 0.00E+00 |
| 42 | 7.46E−23 | −5.58E−27 | 1.61E−31 | 0.00E+00 | 0.00E+00 |

Numerical Example 2

| Surface number | r | d | Nd | vd |
|---|---|---|---|---|
| Object plane | | 6.00 | | |
| 1 | 390.58 | 10.00 | 1.8052 | 25.43 |
| 2 | 432.37 | 81.29 | | |
| 3 | −119.76 | 9.00 | 1.5087 | 56.98 |
| 4 | −241.63 | 6.54 | | |
| 5 | −195.40 | 9.00 | 1.7726 | 48.08 |
| 6 | −163.28 | −9.00 | 1.7726 | 48.08 |
| 7 | −195.40 | −6.54 | | |
| 8 | −241.63 | −9.00 | 1.5087 | 56.98 |
| 9 | −119.76 | −81.29 | | |
| 10 | 432.37 | −10.00 | 1.8052 | 25.43 |
| 11 | 390.58 | 10.00 | 1.8052 | 25.43 |
| 12 | 432.37 | 81.29 | | |
| 13 | −119.76 | 9.00 | 1.5087 | 56.98 |
| 14 | −241.63 | 6.54 | | |
| 15 | −195.40 | 9.00 | 1.7726 | 48.08 |
| 16 | −163.28 | 3.00 | | |

-continued

| Surface number | r | d | Nd | vd |
|---|---|---|---|---|
| 17 | −586.62 | 4.00 | 1.8040 | 46.58 |
| 18 | −192.54 | 4.92 | | |
| 19 | −95.85 | 6.07 | 1.6264 | 32.71 |
| 20 | 80.99 | 12.20 | 1.7053 | 52.19 |
| 21 | −79.05 | 1.34 | | |
| 22 | 77.57 | 14.24 | 1.8040 | 46.58 |
| 23 | −75.54 | 4.00 | 1.5861 | 36.24 |
| 24 | 308.44 | 9.36 | 1.8040 | 46.58 |
| 25 | −158.65 | 29.41 | | |
| 26 | 260.65 | 13.44 | 1.7022 | 52.41 |
| 27 | −59.00 | 4.00 | 1.8052 | 25.43 |
| 28 | −84.22 | 60.04 | | |
| 29 | 2550.04 | 22.62 | 1.7977 | 46.86 |
| 30 | −82.71 | 0.50 | | |
| 31 | 154.20 | 13.22 | 1.8043 | 38.54 |
| 32 | 1196.56 | 20.48 | | |
| 33 | −244.57 | 6.00 | 1.7170 | 28.58 |
| 34 | 94.75 | 59.28 | | |
| 35 | −65.02 | 10.00 | 1.5502 | 42.95 |
| 36 | 699.95 | 9.25 | | |
| 37 | −432.81 | 35.00 | 1.8040 | 46.58 |
| 38 | −104.32 | 0.50 | | |
| 39 | −22758.34 | 25.30 | 1.8041 | 43.70 |
| 40 | −287.63 | 10.00 | | |
| Image plane | | | | |

TABLE 2

| Surface number | k | A | B | C | D |
|---|---|---|---|---|---|
| 1, 11 | 0.00E+00 | −6.82E−09 | −9.57E−14 | −1.01E−17 | 1.31E−22 |
| 3, 9, 13 | 0.00E+00 | 7.48E−08 | 4.86E−12 | 1.54E−16 | 1.79E−21 |
| 6, 16 | 3.54E−01 | 2.22E−08 | 8.79E−13 | 2.90E−17 | 9.81E−22 |
| 17 | 0.00E+00 | −3.60E−06 | −9.38E−10 | 1.40E−12 | −1.57E−15 |
| 19 | 0.00E+00 | 7.53E−06 | −4.06E−09 | 2.99E−12 | −1.77E−15 |
| 22 | 0.00E+00 | −3.34E−06 | 1.42E−09 | −1.56E−12 | 1.18E−15 |
| 28 | 0.00E+00 | 1.13E−07 | 2.12E−11 | −1.26E−16 | −4.38E−18 |
| 30 | 0.00E+00 | 2.94E−07 | 2.33E−11 | 3.36E−15 | 1.01E−19 |
| 33 | 0.00E+00 | −2.57E−09 | −3.00E−11 | 1.16E−14 | −3.85E−18 |
| 36 | 0.00E+00 | −9.41E−08 | 4.24E−12 | 1.97E−15 | −6.89E−19 |
| 40 | 0.00E+00 | −8.24E−08 | 1.57E−12 | 8.65E−16 | −2.47E−19 |

| Surface number | E | F | G | H | J |
|---|---|---|---|---|---|
| 1, 11 | −1.53E−25 | 2.39E−29 | −1.04E−33 | 0.00E+00 | 0.00E+00 |
| 3, 9, 13 | 1.27E−24 | −9.92E−29 | 3.62E−33 | 0.00E+00 | 0.00E+00 |
| 6, 16 | 7.86E−26 | −1.81E−30 | 1.52E−34 | 0.00E+00 | 0.00E+00 |
| 17 | 1.96E−18 | −2.70E−33 | −1.75E−24 | 0.00E+00 | 0.00E+00 |
| 19 | −6.32E−19 | −1.68E−34 | 1.73E−24 | 0.00E+00 | 0.00E+00 |
| 22 | −5.35E−19 | 3.14E−23 | 5.11E−26 | 0.00E+00 | 0.00E+00 |
| 28 | 6.50E−21 | 1.59E−24 | −2.42E−27 | 0.00E+00 | 0.00E+00 |
| 30 | 3.47E−23 | −1.47E−27 | 1.22E−30 | 0.00E+00 | 0.00E+00 |
| 33 | 1.13E−21 | −2.72E−25 | 3.10E−29 | 0.00E+00 | 0.00E+00 |
| 36 | 1.25E−22 | −1.25E−26 | 5.35E−31 | 0.00E+00 | 0.00E+00 |
| 40 | 2.63E−23 | −1.45E−27 | 3.39E−32 | 0.00E+00 | 0.00E+00 |

Numerical Example 3

| Surface number | r | d | Nd | vd |
|---|---|---|---|---|
| Object plane |  | 6.00 |  |  |
| 1 | 461.73 | 10.00 | 1.6031 | 58.77 |
| 2 | 1120.55 | 79.64 |  |  |
| 3 | −106.20 | 9.00 | 1.6541 | 56.52 |
| 4 | −197.77 | 2.00 |  |  |
| 5 | −185.42 | 9.67 | 1.8042 | 40.34 |
| 6 | −152.17 | −9.67 | 1.8042 | 40.34 |
| 7 | −185.42 | −2.00 |  |  |
| 8 | −197.77 | −9.00 | 1.6541 | 56.52 |
| 9 | −106.20 | −79.64 |  |  |
| 10 | 1120.55 | −10.00 | 1.6031 | 58.77 |
| 11 | 461.73 | 10.00 | 1.6031 | 58.77 |
| 12 | 1120.55 | 79.64 |  |  |
| 13 | −106.20 | 9.00 | 1.6541 | 56.52 |
| 14 | −197.77 | 2.00 |  |  |
| 15 | −185.42 | 9.67 | 1.8042 | 40.34 |
| 16 | −152.17 | 20.30 |  |  |
| 17 | 64.13 | 4.25 | 1.8040 | 46.58 |
| 18 | 189.21 | 5.05 |  |  |
| 19 | −83.43 | 7.00 | 1.7060 | 28.56 |
| 20 | 89.39 | 8.41 | 1.7264 | 50.74 |
| 21 | −287.04 | 1.00 |  |  |
| 22 | 80.68 | 1.36 |  |  |
| 23 | 102.32 | 5.62 | 1.8040 | 46.58 |
| 24 | 4255.70 | 7.13 |  |  |
| 25 | 54.32 | 18.20 | 1.8040 | 46.58 |
| 26 | −169.08 | 38.03 |  |  |
| 27 | 112.01 | 28.58 | 1.6393 | 53.55 |
| 28 | −47.40 | 6.00 | 1.8052 | 25.43 |
| 29 | 468.82 | 12.65 |  |  |
| 30 | 299.80 | 30.00 | 1.8046 | 32.49 |
| 31 | −76.74 | 0.50 |  |  |
| 32 | 173.71 | 15.00 | 1.8043 | 37.45 |
| 33 | −786.95 | 24.66 |  |  |
| 34 | −62.97 | 4.00 | 1.7339 | 27.51 |
| 35 | 206.43 | 35.40 |  |  |
| 36 | −50.06 | 28.18 | 1.8040 | 46.58 |
| 37 | −75.07 | 3.00 |  |  |
| 38 | −327.29 | 23.25 | 1.8048 | 29.77 |
| 39 | −134.69 | 6.36 |  |  |
| 40 | 322.77 | 18.82 | 1.8052 | 25.71 |
| 41 | 19763.06 | 30.94 |  |  |
| Image plane |  |  |  |  |

TABLE 3

| Surface number | k | A | B | C | D |
|---|---|---|---|---|---|
| 1, 11 | 0.00E+00 | −1.93E−09 | 3.10E−13 | −5.79E−18 | 1.82E−21 |
| 3, 9, 13 | 0.00E+00 | 5.86E−08 | 4.82E−12 | 6.90E−16 | −1.11E−19 |
| 6, 16 | −5.45E−02 | 1.46E−08 | 6.21E−13 | 5.96E−17 | −8.74E−21 |
| 19 | 0.00E+00 | 2.47E−06 | −8.65E−10 | 8.30E−13 | −8.02E−16 |
| 24 | 0.00E+00 | 1.96E−06 | 1.79E−10 | 7.72E−14 | −4.13E−17 |
| 25 | 0.00E+00 | −1.68E−06 | 2.39E−10 | −2.18E−13 | 6.00E−17 |
| 31 | 0.00E+00 | 1.48E−07 | 3.92E−11 | 7.68E−15 | −3.88E−19 |
| 34 | 0.00E+00 | 3.10E−07 | 1.04E−10 | 2.08E−14 | −4.65E−18 |
| 41 | 0.00E+00 | −2.40E−08 | −3.46E−13 | 1.26E−16 | −6.80E−21 |

TABLE 3-continued

| Surface number | E | F | G | H | J |
|---|---|---|---|---|---|
| 1, 11 | −8.43E−26 | −3.48E−29 | 3.00E−33 | 0.00E+00 | 0.00E+00 |
| 3, 9, 13 | 2.52E−23 | −2.18E−27 | 1.21E−31 | 0.00E+00 | 0.00E+00 |
| 6, 16 | 1.34E−24 | −8.48E−29 | 2.92E−33 | 0.00E+00 | 0.00E+00 |
| 19 | 3.30E−19 | 0.00E+00 | 0.00E+00 | 0.00E+00 | 0.00E+00 |
| 24 | 2.58E−20 | 0.00E+00 | 0.00E+00 | 0.00E+00 | 0.00E+00 |
| 25 | −1.67E−20 | 0.00E+00 | 0.00E+00 | 0.00E+00 | 0.00E+00 |
| 31 | 5.62E−23 | 0.00E+00 | 0.00E+00 | 0.00E+00 | 0.00E+00 |
| 34 | 1.54E−21 | 0.00E+00 | 0.00E+00 | 0.00E+00 | 0.00E+00 |
| 41 | 1.03E−25 | 0.00E+00 | 0.00E+00 | 0.00E+00 | 0.00E+00 |

TABLE 4

| | Embodiment 1 | Embodiment 2 | Embodiment 3 |
|---|---|---|---|
| Focal length (f1) of first imaging optical system | 84.676 | 90.963 | 86.294 |
| Power ($\phi$1) of first imaging optical system | 0.01181 | 0.010993 | 0.011588 |
| Focal length (f2) of second imaging optical system | 398.926 | 357.413 | 657.569 |
| Power ($\phi$2) of second imaging optical system | 0.002507 | 0.002798 | 0.001521 |
| Paraxial radius of curvature (M1R) of reflection surface of first optical element M1 | 337.13 | 390.58 | 461.73 |
| Abbe number ($\nu$1) of material of first optical element M1 | 25.43 | 25.43 | 58.77 |
| Paraxial radius of curvature (Rn1) of surface of negative lens L1 at object side | −120.718 | −119.758 | −106.198 |
| Paraxial curvature (c1) of surface of negative lens L1 at object side | −0.00828 | −0.00835 | −0.00942 |
| Paraxial radius of curvature (Rn2) of surface of negative lens L1 at image side | −213.766 | −241.631 | −197.766 |
| Paraxial curvature (c2) of surface of negative lens L1 at image side | −0.00468 | −0.00414 | −0.00506 |
| Refractive index (n) of material of negative lens L1 | 1.5237 | 1.5087 | 1.6541 |
| Abbe number ($\nu$n) of material of negative lens L1 | 60.1 | 56.98 | 56.52 |
| Focal length of negative lens L1 | −548.227 | −478.688 | −364.813 |
| Power ($\phi$n) of negative lens L1 | −0.00182 | −0.00209 | −0.00274 |
| Paraxial radius of curvature (M2R) of reflection surface of second optical element M2 | −152.435 | −163.276 | −152.173 |
| Paraxial curvature (c3) of reflection surface of second optical element M2 | −0.00656 | −0.00612 | −0.00657 |
| Abbe number ($\nu$2) of material of second optical element M2 | 35.83 | 48.08 | 40.34 |

TABLE 4-continued

| | Embodiment 1 | Embodiment 2 | Embodiment 3 |
|---|---|---|---|
| Distance (t1) between M1 and L1 | 65.1793 | 81.2864 | 79.6399 |
| Distance (t2) between L1 and M2 | 8.8236 | 6.5388 | 2 |
| c1 − c3 | −0.00172 | −0.00223 | −0.00284 |
| ABS(c1 − c3) | 0.001724 | 0.002226 | 0.002845 |
| c1 − c2 | −0.00361 | −0.00421 | −0.00436 |
| ABS(c1 − c2) | 0.003606 | 0.004212 | 0.00436 |
| ABS(c1 − c2) + ABS(c1 − c3) | 0.005329 | 0.006437 | 0.007205 |

TABLE 5

| Conditional Expression | Embodiment 1 | Embodiment 2 | Embodiment 3 |
|---|---|---|---|
| (1) $|\phi n/\phi 1|$ | 0.154 | 0.190 | 0.236 |
| (2) R1n/R2n | 0.5647 | 0.4956 | 0.5369 |
| (3) M1R/M2R | −2.21 | −2.392 | −3.034 |
| (4) t1/f1 | 0.770 | 0.894 | 0.923 |
| (5) t2/t1 | 0.135 | 0.080 | 0.025 |
| (6) $\nu$1/$\nu$2 | 0.710 | 0.529 | 1.457 |
| (7) $\nu$2/$\nu$n | 0.596 | 0.8438 | 0.7137 |
| (8) n | 1.5237 | 1.5087 | 1.6541 |
| (9) r1/r2 | 0.900 | 0.903 | 0.412 |
| (10) $\phi$2/$\phi$1 | 0.212 | 0.255 | 0.131 |

This application claims the benefit of Japanese Patent Application No. 2011-035746, filed on Feb. 22, 2011, which is hereby incorporated by reference herein in its entirety.

What is claimed is:

1. A catadioptric optical system comprising:
 a first imaging optical system that includes a catadioptric part configured to collect a light beam from an object to form an intermediate image of the object; and
 a second imaging optical system that includes a refractive part configured to image the intermediate image on an image plane,
 wherein the first imaging optical system includes a first optical element having a light transmission part around an optical axis and a reflection part including a surface as a reflection surface provided at an outer circumference side relative to the light transmission part and disposed at the object side, a second optical element having a light transmission part around the optical axis and a reflection part including a surface as a reflection surface provided at an outer circumference side relative to the light transmission part and disposed at the image side, and a negative lens in an optical path between the first optical element and the second optical element, the first optical element and the second optical element being disposed so that the reflection part of the first optical element and the reflection part of the second optical element face each other, wherein the light beam from the object emits to a side of the second imaging optical system via the light transmission part of the first optical element, the negative lens, the reflection part of the second optical element, the negative lens, the reflection part of the first optical element, the negative lens, and the light transmission part of the second optical element, in order, and wherein the following expressions are met:

$$0.1<|\phi n/\phi 1|<0.3$$

$$0.3<R1n/R2n<0.8$$

where $\phi n$ is a power of the negative lens, R1$n$ and R2$n$ are radii of curvature of lens surfaces of the negative lens at an object side and an image side, respectively, and $\phi 1$ is a power of the first imaging optical system.

2. The catadioptric optical system according to claim 1, wherein the following expression is met:

$$-3.5<M1R/M2R<-2.0$$

where M1R is a radius of curvature of the reflection part of the first optical element, and M2R is a radius of curvature of the reflection part of the second optical element.

3. The catadioptric optical system according to claim 1, wherein the following expressions are met:

$$0.6<t1/f1<1.0$$

$$0.01<t2/t1<0.20$$

where f1 is a focal length of the first imaging optical system, t1 is a distance from a surface of the first optical element at the image side to a surface of the negative lens at the object side, and t2 is a distance from a surface of the negative lens at the image side to a surface of the second optical element at the object side.

4. The catadioptric optical system according to claim 1, wherein the following expressions are met:

$$0.40<v1/v2<1.60$$

$$0.5<v2/vn\leq 1.0$$

$$1.50<n<1.70$$

where v1, v2, and vn are Abbe numbers of materials of the first and second optical elements, and the negative lens, respectively, and n is a refractive index of the material of the negative lens.

5. The catadioptric optical system according to claim 1, wherein the following expression is met:

$$0.40<r1/r2<1.00$$

where r1 and r2 are radii of curvature of surfaces of the first optical element at the object side and the image side, respectively.

6. The catadioptric optical system according to claim 1, wherein the following expression is met:

$$0.10<\phi 2/\phi 1<0.30$$

where $\phi 2$ is a power of the second imaging optical system.

7. The catadioptric optical system according to claim 1, wherein the first optical element has a surface having a convex and meniscus shape at the object side and has a positive refractive power, the negative lens has a surface having a concave and meniscus shape at the object side, and the second optical element has a surface having a convex and meniscus shape at the image side and has a positive refractive power.

8. An image pickup apparatus comprising:

a light source unit;

an illumination optical system configured to illuminate an object using a light beam from the light source unit;

a catadioptric optical system according to claim 1, configured to image the object;

an image pickup element configured to perform a photoelectric conversion of an object image that is imaged by the catadioptric optical system; and an image processing system configured to generate image information based on data from the image pickup element.

9. The image pickup apparatus according to claim 8, wherein a field area on the object is at least $\phi 3$ mm.

* * * * *